United States Patent [19]

Aujollet et al.

[11] Patent Number: 5,796,798
[45] Date of Patent: Aug. 18, 1998

[54] INTERNAL CONDENSER VAPOR DISCHARGE SYSTEM

[75] Inventors: Patrick Aujollet; Guy-Marie Gautier, both of Pertuis, France

[73] Assignee: Commissariat a l'Energie Atomique, Paris, France

[21] Appl. No.: 896,945

[22] Filed: Jul. 18, 1997

[30] Foreign Application Priority Data

Jul. 19, 1996 [FR] France .................. 96 09099

[51] Int. Cl.$^6$ .......................... G21C 9/004; B01F 15/02
[52] U.S. Cl. .............. 376/283; 376/407; 366/101; 366/163.2; 366/173.2; 165/110
[58] Field of Search ................ 376/283, 372, 376/403, 407; 165/110, 110 DC, 111 DC; 366/101, 163.2, 173.2; 239/310, 317

[56] References Cited

U.S. PATENT DOCUMENTS

| | | | |
|---|---|---|---|
| 4,022,655 | 5/1977 | Gaouditz et al. | 376/283 |
| 4,252,611 | 2/1981 | Mitzumachi et al. | 376/283 |
| 4,428,904 | 1/1984 | Kuhnel | 376/283 |
| 4,567,016 | 1/1986 | Tong | 376/283 |
| 5,102,617 | 4/1992 | Gluntz et al. | 376/283 |

FOREIGN PATENT DOCUMENTS 475700  3/1992  European Pat. Off. .

OTHER PUBLICATIONS

Patent Abstracts of Japan. vol. 003. No. 148. Dec. 7, 1979, and JP 54–123689. Sep. 26, 1979.

Derwent Database WPI. Section Ch. Week 8525, and JP 60–85391. May 14, 1985.

Derwent Database WPI. Section Ch Week 8441, and JP 59–151091. Aug. 29, 1984.

Patent Abstracts of Japan, vol. 004, No. 023. Feb. 26, 1980, and JP 54–162089. Dec. 22, 1979.

*Primary Examiner*—Daniel D. Wasil
*Attorney, Agent, or Firm*—Michael N. Meller

[57] ABSTRACT

Internal condenser system for discharging vapor from a circuit into a tank or pool to reduce pressure in said circuit.

The internal condensation conduit (47) comprises a diaphragm (52) just upstream of a cold liquid feed orifice (55); the jet of vapor passing through orifice (53) of the diaphragm creates a zone of significantly negative pressure around this jet and downstream of the diaphragm causing cold liquid to be sucked up. This causes the vapor to condense in the mixing chamber (56).

One possible application relates to primary circuits of a nuclear reactor.

7 Claims, 3 Drawing Sheets

INTERNAL CONDENSER VAPOR DISCHARGE SYSTEM

DESCRIPTION

This invention relates to a system for discharging vapor from a circuit into a pool or other tank, said system principally comprising an internal condenser.

FIELD OF THE INVENTION

Before working on a primary cooling circuit 1 (see FIG. 1), in which a fluid known as the "primary fluid" circulates under pressure between a hot source 2 and a cold source 3, the pressure value of said fluid must be lowered. Reducing the pressure value of primary fluid is usually achieved by reducing the energy supplied by hot source 2 at the exchanger 8 formed by the primary heat circuit 1 with regard to said hot source 2 and by increasing the energy absorbed by cold source 3.

Energy can be extracted towards cold source 3 by means of heat exchange devices 7 (again formed by primary circuit 1), or by direct discharge of the fluid contained in primary circuit 1 into cold source 3. Pressurized primary fluid is discharged by opening the valve or valves 9 of a discharge system 4 connected to primary circuit 1 and the primary fluid is then discharged through a diffuser 5 at the end of a discharge system 4 into a drum or low-pressure discharge pool 6.

The present invention consists of a condensor-diffusor apparatus that replaces the discharge diffuser 5 and that reduces vibration and stress on the structures of discharge tank 6 during discharge of primary circuit coolant in the vapor phase or as diphasic fluid.

To simplify the description an embodiment in which the coolant fluid contained in circuit 1 is a diphasic mixture of water at high temperature and under high pressure that is discharged into an open pool 6 filled with liquid phase water at twenty degrees Celsius.

Particular attention will be devoted to the discharge of the contents of primary circuit 1 in the vapor phase.

PRIOR ART

When the level of vapor output is low, a simple tube discharging below the water level of discharge pool 6 is often used as a collector-diffuser.

At higher levels of vapor output (several hundred kg/sec.), as is the case with Boiling Water Reactors (see: 8th Pacific Rim Nuclear Conference, Taipei, Taiwan, 12–16 April, article on "General Electric Advanced Boiling Water Reactors and Plant System Design" by D. R. Wilkins and J. Chang), the water contained in discharge pool 6 may be propelled out of pool 6 by the thrust of the pressurized vapor. The risk of this occurring can be reduced by increasing the contact surface between the high-pressure vapor and the low pressure liquid water in discharge pool 6 in order to facilitate heat exchange between the vapor discharged by the primary circuit 1 coolant and the liquid contained in the tank or discharge pool 6.

FIG. 2 shows the principle on which this type of apparatus is based: the fluid described as "primary" is conducted from primary circuit 1 at high temperature and under high pressure via a main discharge pipe 10 connected to the discharge system 4 to diffuser 5 where it flows into the discharge pool 6.

This apparatus reduces the resultant of the impetus forces of fluid discharged into the pool 6 since it reduces the release speed of the discharged fluid and multiplies the directions of the jets via a plurality of orifices 13 disposed over the entire surface of the arms 14 radiating from diffuser 5.

This apparatus also gives an increased contact surface between the primary fluid leaving orifices 13 at high temperature and under high pressure and the water in pool 6.

This type of apparatus cannot, however, be used to control the expansion and condensation of the many vapor bubbles in low pressure discharge pool 6.

The high-pressure vapor bubbles initially expand very rapidly on leaving the orifices 13. They may then:

coalesce into clusters and rise rapidly to the surface of the liquid in the pool 6, thereby causing the water in pool 6 to rise, condense very suddenly as they leave the discharge orifices 13 and come into contact with the cold fluid; this causes shock micro-waves due to the difference in volume between bubbles of vapor and bubbles in liquid form.

These phenomena cause disturbances that propagate through the water of the discharge pool 6 to reach the pool's sides and support structures.

Account should also be taken of the possible presence of air in the main discharge pipe 10 and diffuser 5 before the vapor discharge system 4 is opened. Any air present in the piping is subjected to extreme pressure in main pipe 10 and collector-diffuser 5; when it is discharged into discharge pool 6 this may cause a significant rise in the water level even causing the pool 6 to overflow.

This type of diffuser apparatus 5 is fitted to Boiling Water Reactors when carrying out rapid depressurization of primary circuit 1. The range of values covered is from 7 Mpa to less than 1 Mpa.

Westinghouse's planned Pressurized Water Reactor (see "AP600 and Advanced Passive 600 Mwe Plant Simplified for the 1990s and Beyond", Nuclear Engineering International, November 1988) includes a similar apparatus that covers a range of pressure values from 16 Mpa to less than 0.5 Mpa. In both cases vapor output can be very high, of the order of several hundred kilograms per second.

PRINCIPLE OF THE INVENTION

The present invention relates to a vapor discharge system comprising at least one internal condensation conduit that ensures that only hot liquid under low pressure is released into the discharge pool.

This has the advantage of avoiding all the consequences of high-pressure jets of vapor condensing in a low-pressure tank, i.e. variations in volume caused by the expansion of vapor when it passes from high to low pressure, movements of fluid created by the movement of vapor in the discharge pool or air blast in the piping when vapor is discharged.

The internal condensation conduit enables a sufficient quantity of low-pressure cold liquid to be sucked in to condense the incoming vapor before releasing the liquid thereby formed into the pool or, more generally, into the tank. In its most general form the invention thus relates to a system for discharging the vapor from a circuit into a pool, comprising an internal condensation conduit connected to the circuit and opening into the pool, characterized in that it comprises a diaphragm with an orifice disposed in the conduit and a cold liquid feed orifice passing through the conduit immediately downstream of the diaphragm and connected to a liquid feed tank.

The tank may be separate from the pool or identical with it, and the conduit may be immersed in the pool or external to it. The pool may be any type of open or closed tank.

DESCRIPTION OF FIGURES

Other details and apparatuses of the invention will be better understood in the light of the following detailed description of the Figures below.

DETAILED DESCRIPTION OF AN INTERNAL CONDENSATION SYSTEM

In all the following descriptions fluid is assumed to flow from the pressurized primary circuit to the low-pressure discharge tank.

In order to explain the present invention more clearly an embodiment in which high pressure steam is discharged into a discharge pool filled with liquid water at low temperature (of the order of twenty degrees Celsius) will be used as an example. The use of this example in no way limits the field of application of the invention.

Figure 1:
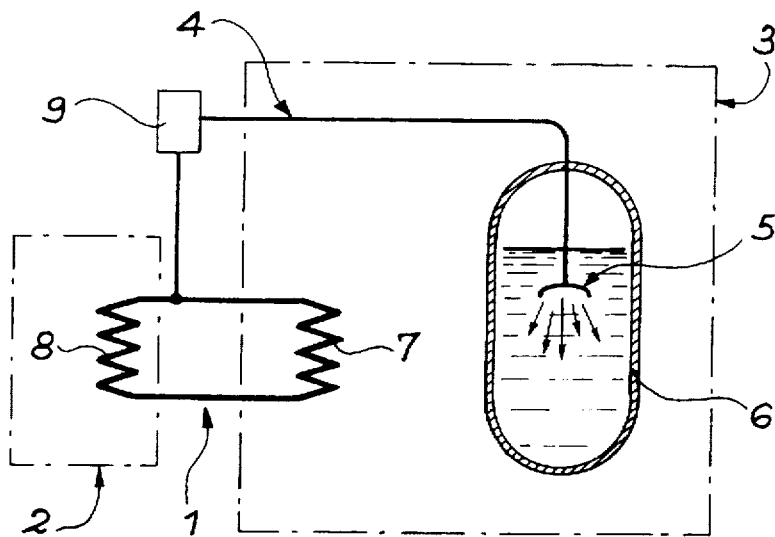
FIG. 1 (already described) shows a primary circuit and a discharge system.
Figure 2:
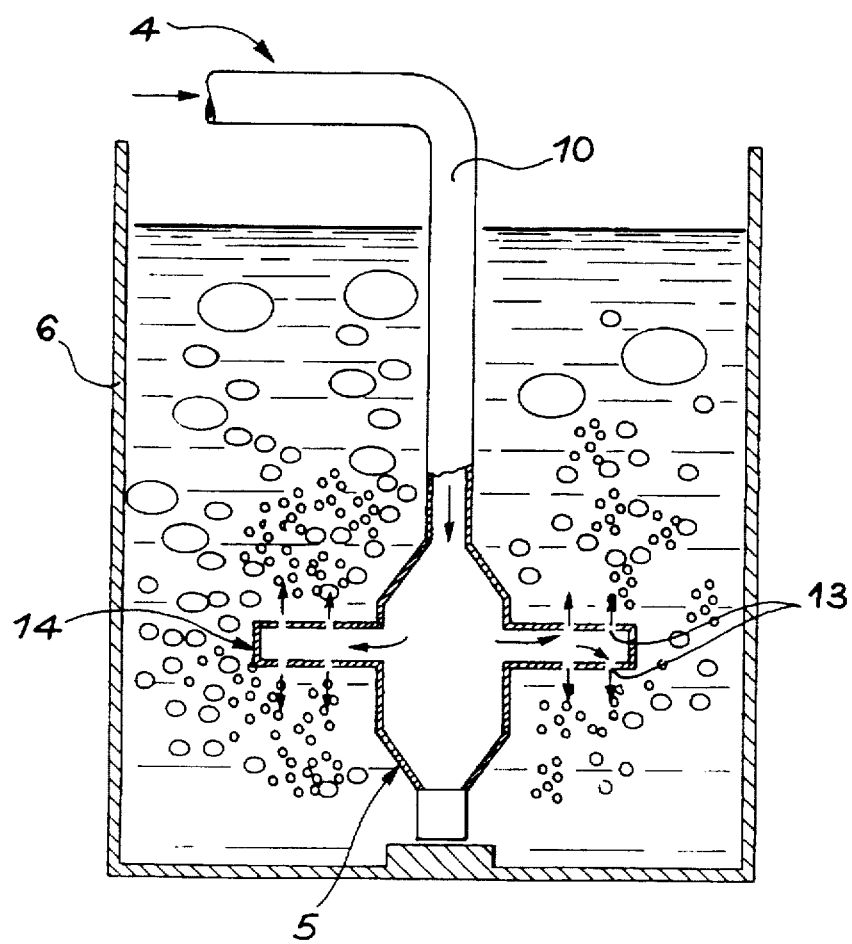
FIG. 2 (already described) shows a known discharge system.
Figure 3:
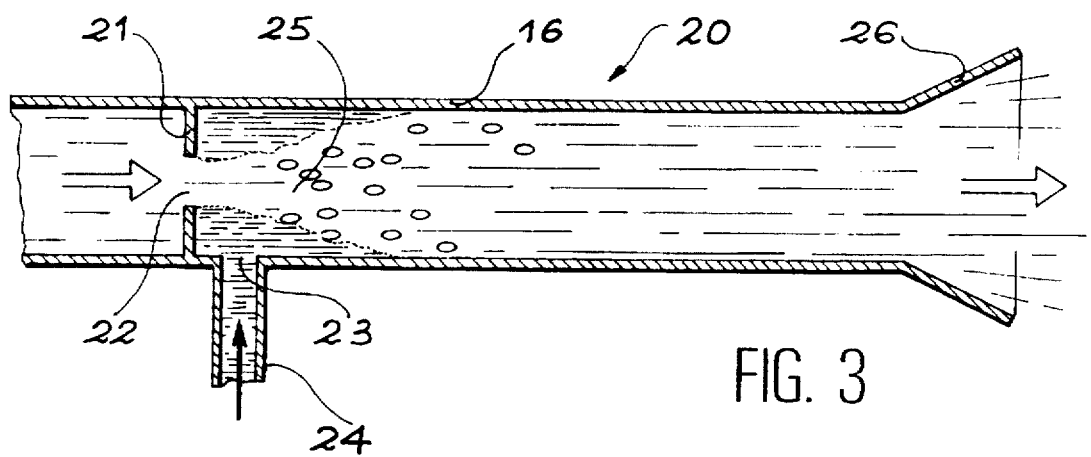
FIG. 3 is a detailed illustration of an internal condensation discharge system according to the invention.

The internal condensation conduit 20 according to the invention is shown in isolation in FIG. 3. The conduit essentially consists of a discharge conduit 16 similar to the piping 10 of the previous embodiment and, like said piping, filled with water, vapor or a mixture of the two. Working downstream, the conduit consists of:

a diaphragm 21 obturating part of the cross-section of discharge conduit 16 except for an orifice 22, at least one cold water inlet orifice 23 located downstream of diaphragm 21; this orifice 23 is the outlet of a cold water feed pipe 24 into discharge conduit 16, a mixing chamber 25 formed by discharge conduit 16 downstream of orifice 23, lastly, a diffuser 26 in the shape of a conical mouth may be fitted to the outlet of discharge conduit 16.

Figure 4:
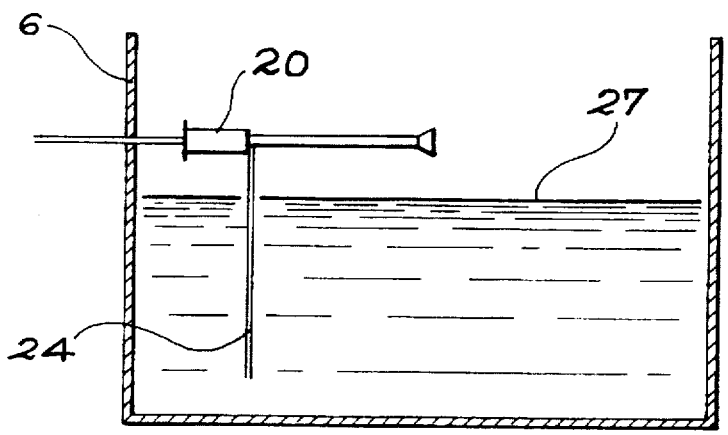
FIGS. 4 and 5 illustrate two examples of how the system may be disposed.

FIG. 4 shows an example of an application of the invention in which the apparatus shown in FIG. 3 is incorporated into discharge pool 6 that is, as above, partially filled with water. The conduits are generally located above the initial water level 27 of the pool 6, except for cold water feed pipe 24 that is immersed below level 27.

During a depressurization operation the pressurized vapor coming from feed conduit 12 forms a jet of vapor that passes through diaphragm 21. A zone of significantly negative pressure is created downstream of the diaphragm around this jet causing water from pool 6 to be sucked up through feed pipe 24. This water enters the mixing chamber 25 and causes the vapor jet to condense so that nothing but hot water flows out of mixing chamber 25.

The advantage of the embodiment shown in FIG. 4, in which the internal condensation conduit 20 is disposed above the water level 27 of pool 6 is that the air initially contained in the piping can be expelled without any risk of damaging pool 6.

As hot liquid is discharged through discharge piping 16, the level of pool 6 rises and may cover internal condensation conduit 20. This conduit continues to function normally even when located below water level 27.

EMBODIMENT WITH SEPARATE FEED TANK AND DISCHARGE POOL

Figure 5:
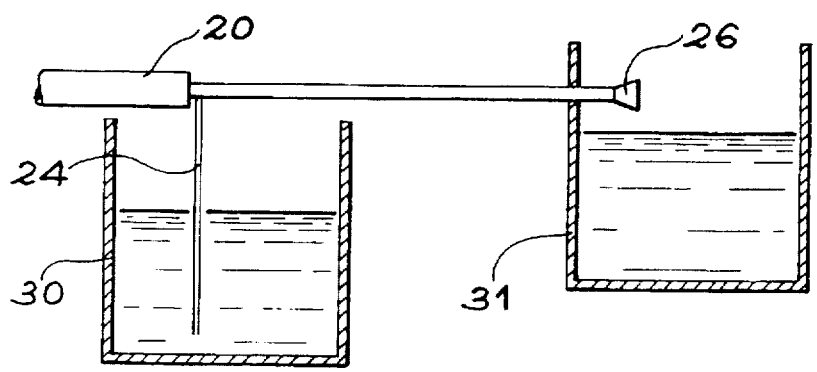

Other embodiments of the invention are possible: for example, as shown in FIG. 5, the pool 6 may be divided into a cold liquid water feed tank 30 and a discharge tank 31. In the example of this embodiment in FIG. 5 the feed tank 30 is shown below internal condensation conduit 20 but it may equally well be disposed above it. Internal condensation conduit 20 may also pass through feed tank 30.

In all embodiments feed pipe 24 is immersed in the water of feed tank 30 and conduit 16 discharges into discharge tank 31.

EMBODIMENT WITH INTERNAL CONDENSATION SYSTEM IMMERSED IN THE POOL

Figure 6:
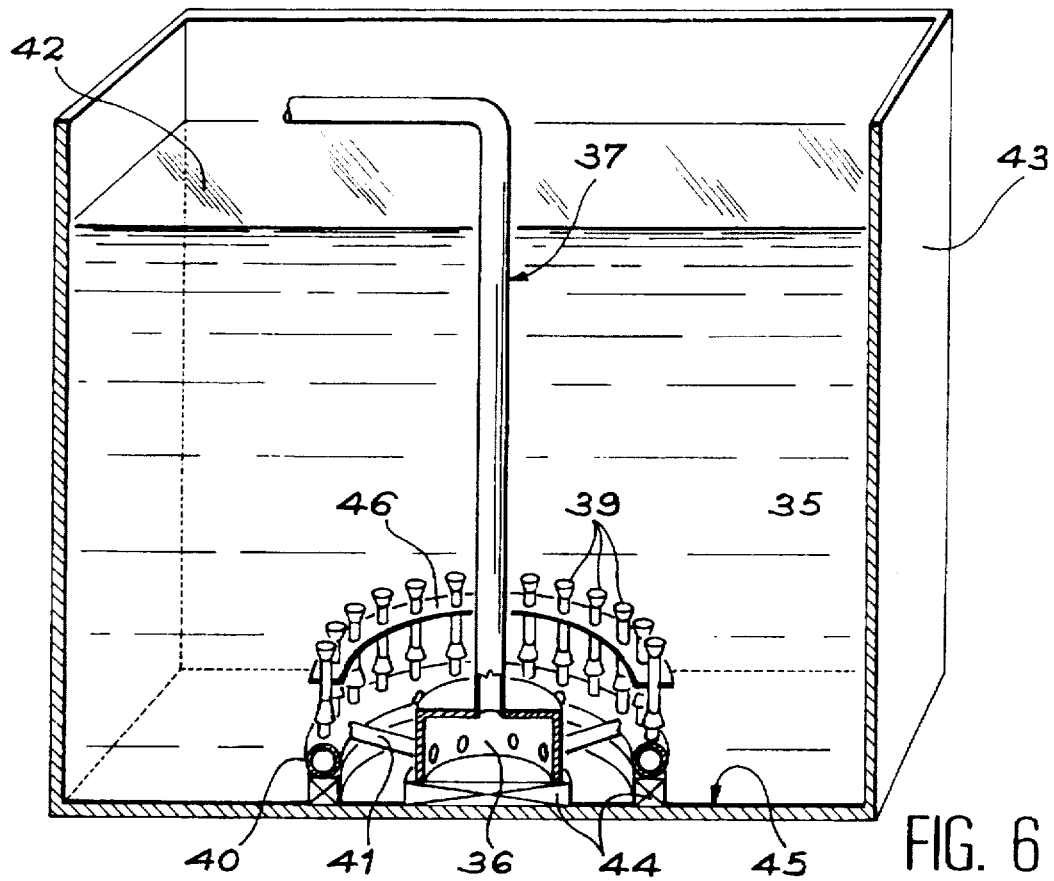
FIG. 6 shows another discharge system according to the invention.

Another embodiment of the invention may have a plurality of separate internal condensation conduits that are all identical to those in the foregoing embodiments. As can be seen from FIG. 6, a more complicated discharge system may also be used. This system 35 comprises a collector 36 in the form of a chamber connected via a toric distributor 40 to one or more vertical discharge pipes 37 and a plurality of internal vertical condensation pipes 39 that open upwards. The toric distributor 40 is connected to the internal condensation conduits 39 and the radial arms 41 that also connect with the collector 36.

The collector 36, the toric distributor 40, the arms 41 and the internal condensation conduits 39 are all immersed below the surface level 42 of the water in pool 43. As can be seen from FIG. 6, the assembly can be supported by a foot 44 fastened to the bottom 45 of the pool. This foot comprises supporting structures that may or may not be different from collector 36 and toric distributor 40; it may be replaced by structures built into the shell of the pool that maintain said components at a higher level.

The internal condensation conduits 39 are held in place by toric distributor 40 to which they are fastened and they are held together by a metallic vibration-resistant metal structure 46 that consists of a metal plate connecting them.

Figure 7:
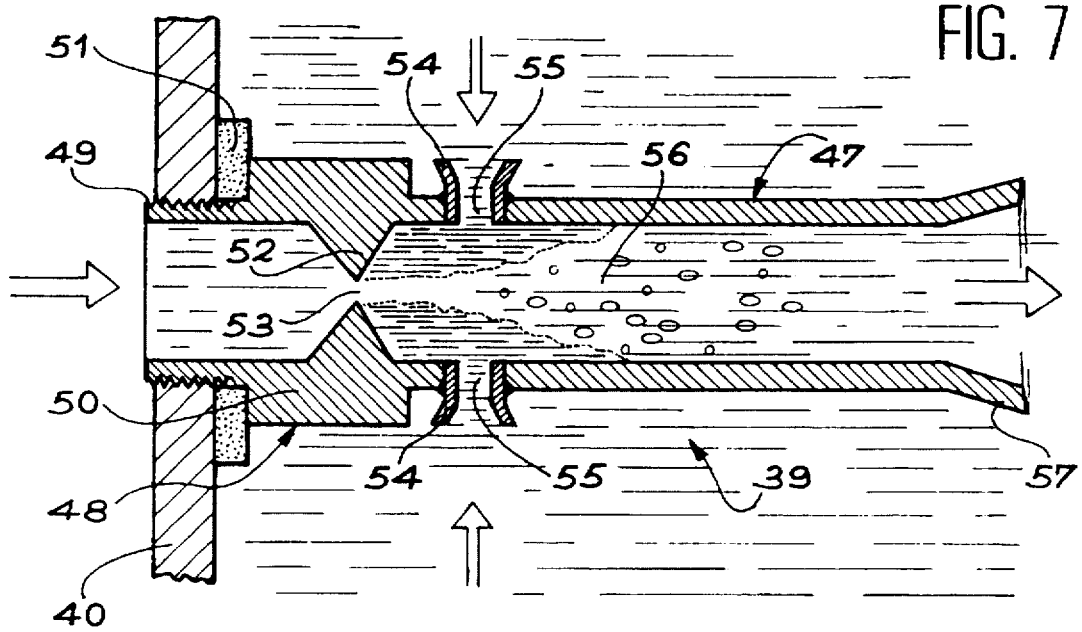
FIG. 7 shows the internal condensation system of the discharge system.

The structure and operation of the internal condensation conduits 39 are more or less the same as in the previous embodiments. This can be seen from FIG. 7, which shows an example of an embodiment of these systems. Each system comprises a discharge pipe 47 that ends in a seat 48 fastened to the envelope of toric distributor 40 by a threaded end 49; the base 48 comprises another widening 50 that serves to press a leaktight seal 51 against the envelope of the toric distributor 40.

A diaphragm 52 with an orifice 53 similar to the foregoing is disposed inside conduit 47. The internal condensation conduit 39 is fed with cold water via one or more nozzles 54 welded to the wall of discharge conduit 47 just downstream of the diaphragm 52. These nozzles constitute orifices 55 that feed the water from pool 43 into discharge conduit 47. Again, the vapor passing through diaphragm 52 is under negative pressure and sucks in cold water, condensing the vapor in a mixing chamber 56 formed by discharge conduit 47.

The outlet of discharge conduit 47 is fitted with a diffuser 57 to reduce the output speed of the liquid that drains into pool 43. An elbow may be fitted to the outlet of mixing chamber 56 to orient the jet in a given direction.

We claim:

1. System for discharging fluid from a circuit (1) into a pool (6, 31, 43), comprising an internal condensation conduit (20, 39, 47) connected to said circuit (1) and opening into the pool, characterized by the fact that it comprises a diaphragm (21, 52) with an orifice (22, 53) in the conduit and a cold water feed orifice (23, 55) passing through the conduit immediately downstream of the diaphragm and communicating with a liquid feed tank (6, 30, 43).

2. Discharge system of claim 1, characterized in that the feed tank is identical with the pool (6, 43), the conduit (20) being immersed in the cold liquid filling the pool (6, 43), a feed conduit (24) linking the cold liquid and the orifice (23).

3. Discharge system of claim 1, characterized in that the tank is identical with the pool (43), the conduit (47) being immersed in the cold liquid and the orifice (55) opening into the pool via a nozzle (54).

4. Discharge system of claim 1, characterized in that the feed tank (30) is separate from the pool (31).

5. Discharge system of claim 1, characterized in that the conduit (20, 47) ends in a diffuser (26, 57).

6. Discharge system of claim 3, characterized in that a plurality of internal condensation conduits (39) are connected to a common feed conduit (37) by a distributor (40).

7. Discharge system of claim 6, characterized in that the common feed conduit (37) is placed vertically in the pool and is connected to the distributor by a chamber (36) placed on the bottom (45) of the pool (43), the distributor (40) also being placed on the bottom of the pool and the internal condensation conduits (39) opening towards the top of distributor (40).

* * * * *